(12) United States Patent
Stall

(10) Patent No.: US 7,506,345 B2
(45) Date of Patent: *Mar. 17, 2009

(54) METHOD AND APPARATUS FOR ADAPTING AND HOSTING LEGACY USER INTERFACE CONTROLS

(75) Inventor: Jeffrey E Stall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

This patent is subject to a terminal disclaimer.

(21) Appl. No.: 11/171,035

(22) Filed: Jun. 30, 2005

(65) Prior Publication Data

US 2005/0240944 A1    Oct. 27, 2005

Related U.S. Application Data

(63) Continuation of application No. 09/885,366, filed on Jun. 20, 2001, now Pat. No. 6,961,945.

(60) Provisional application No. 60/244,384, filed on Oct. 30, 2000.

(51) Int. Cl.
*G06F 9/54* (2006.01)

(52) U.S. Cl. .................. 719/329; 719/320; 719/328; 715/804

(58) Field of Classification Search .................. 719/320, 719/328, 329; 715/804
See application file for complete search history.

(56) References Cited

U.S. PATENT DOCUMENTS

| | | | |
|---|---|---|---|
| 5,831,609 A | 11/1998 | London et al. | |
| 6,182,276 B1 | 1/2001 | Brawn et al. | |
| 6,570,595 B2 * | 5/2003 | Porter | 715/802 |
| 6,573,904 B1 | 6/2003 | Chun et al. | |
| 6,611,878 B2 | 8/2003 | De Armas et al. | |
| 6,675,230 B1 * | 1/2004 | Lewallen | 719/328 |
| 6,675,371 B1 | 1/2004 | York et al. | |

OTHER PUBLICATIONS

Badros, Greg J., et al., "SCWM: An Intelligent Constraint-Enabled Window Manager," *Smart Graphics: Papers from the 2000 American Assoc. for Artificial Intelligence Symposium*, Stanford, Calif., Mar. 20-22, 2000, pp. 76-83.

(Continued)

*Primary Examiner*—Li B Zhen
(74) *Attorney, Agent, or Firm*—Christensen O'Connor Johnson Kindness PLLC

(57) ABSTRACT

A method and apparatus for adapting and hosting legacy user interface controls is provided. Legacy user interface controls are exposed within a new window manager as native user interface objects. A bridge between a hosted legacy user interface control and the legacy window manager intercepts messages intended for the hosted user interface control. The messages are filtered to determine if they should be passed to the new window manager. If a message is to be forwarded, the message is forwarded to a root Visual Gadget in the new window manager. The message is processed and routed down the window tree to an adapter control for hosting the legacy user interface control. The adapter control processes the message and routes the message to any listener objects attached to the adapter. If the message has not been completely handled, the message is "bubbled" up the window tree to the parent objects of the adapter control for additional processing.

5 Claims, 6 Drawing Sheets

OTHER PUBLICATIONS

Campbell, G.H., Jr., "Adaptable Components," *Proc. 1999 Int'l. Conf. Software Engineering*, IEEE and ACM SIGSOFT, Los Angeles, Calif., May 16-22, 1999, pp. 685-686.

Coffee, P., "Designer Widgets Gives Developers Galore," *PC Week* 13(7):82, Feb. 19, 1996.

Goodfellow, M.J., "WHIM, the Window Handler and Input Manager," *Proc. 1st Int'l. Conf. Computer Workstations*, IEEE, San Jose, Calif., Nov. 11-14, 1985, pp. 12-21.

Hiraga, R., and Y.-C. Lien, "Managing Objects in a User Interface System With ROBA," *SIGCHI Bulletin* 22(1):49-51, Jul. 1990.

Miah, T., and J.L. Alty, "Vanishing Windows—A Technique for Adaptive Window Management," *Interacting with Computers* 12(4):337-355, Feb. 2000.

Noble, R., and C. Runciman, Gadgets: Lazy Functional Components for Graphical User Interfaces, *Proc. 7th Int'l. Symp. Programming Languages: Implementations, Logics and Programs*, Utrecht, Netherlands, Sep. 20-22, 1995, pp. 321-340.

Pour, G., "Understanding Software Component Technologies: JavaBeans and ActiveX," *Proc. 29th Conf. Technology of Object-Oriented Languages and Systems*, Nancy, France, Jun. 7-10, 1999, p. 398.

* cited by examiner

METHOD AND APPARATUS FOR ADAPTING AND HOSTING LEGACY USER INTERFACE CONTROLS

CROSS-REFERENCE TO RELATED APPLICATIONS

This application is a continuation of prior application Ser. No. 09/885,366, filed Jun. 20, 2001, which claims the benefit of provisional Application No. 60/244,384, filed Oct. 30, 2000, priority from the filing date of which is hereby claimed under 35 U.S.C. § 120.

FIELD OF THE INVENTION

This invention generally relates to the field of computing devices with graphical user interfaces. More specifically, this invention relates to hosting legacy user interface controls within new window managers.

BACKGROUND

Graphical user interfaces typically employ some form of a window manager to organize and render windows. Window managers commonly utilize a window tree to organize windows, their child windows, and other user interface controls to be displayed within the window such as buttons, menus, etc. To display the windows on a display screen, a window manager will parse the window tree and render the windows and other user interface objects in memory. The memory can then be displayed on a video screen. A window manager may also be responsible for "hit-testing" input to determine in which window input was received. For instance, when a user moves a mouse cursor into a window "clicks," the window manager must determine the window in which the click was made and generate a message to that window.

When creating an entirely new window manager, it is typically necessary to create new user interface controls, otherwise known as visual objects, which can be utilized by the window manager. For instance, it may be necessary to build new buttons, pull-down menus, and other visual objects that are compatible with the new window manager. However, creating an entirely new set of user interface controls can be extremely time consuming and difficult. Moreover, creating an entirely new set of user interface controls for a new window manager seems wasteful considering that there are thousands of user interface controls available for use with previous window managers.

Methods exist for hosting legacy user interface controls within new window managers. However, these previous methods suffer from several serious drawbacks. In particular, these previous methods are unable to handle messages intended for the legacy user interface controls without requiring window sub-classing or modifying the user interface message loop to pre-translate messages. Moreover, existing methods either require changing sources of the existing controls, or severely limit the integration of the existing controls. Requiring the sources to be changed prevents using existing controls without modification, a severe problem for the thousands of existing user interface controls available in the market today. Another previous solution is to expose the existing user interface control as a "foreign" object. This, however, requires other controls to treat that object with special knowledge and calling different application programming interfaces ("APIs"). Accordingly, these previous methods are unable to handle messages intended for legacy user interface controls in a high-performance and robust manner.

Therefore, in light of the above, there is a need for a method and apparatus for adapting and hosting legacy user interface controls that can utilize a legacy user interface control in a new window manager without requiring window sub-classing or modifying the message loop to pre-translate messages. There is a further need for a method and apparatus for adapting and hosting legacy user interface controls that can utilize legacy user interface controls in a new window manager without requiring modification of the controls or treating the controls differently than native controls.

SUMMARY

The present invention solves the above-problems by providing a method and apparatus for adapting and hosting legacy user interface controls in a new window manager. Generally described, the present invention exposes legacy user interface controls, such as window handles ("HWNDs"), as native user interface controls, or Visual Gadgets, to the new window manager. The present invention also hooks into the messaging infrastructure of the legacy window manager and intercepts messages intended for the hosted legacy user interface control. The messages can then be provided to the hosted legacy user interface control and other native Visual Gadgets.

Additionally, the present invention allows using existing user interface controls in a new window manager, without requiring source modification of the controls and without requiring other controls to treat the existing controls specially. It also allows existing controls to be identified as being "adapted," without requiring special handling for handling other existing controls. By not requiring special handling of individual "foreign" object types, new object types can be added without requiring modifications in the legacy window manager. Also, existing adapter implementations can be modified without requiring modifications in either the legacy window manager or requiring modifications on existing controls.

More specifically described, the present invention exposes legacy user interface controls in a new window manager by exposing the legacy user interface controls as native Visual Gadgets. The present invention also provides a bridge between a hosted legacy user interface control and the legacy window manager. The bridge intercepts messages intended for the hosted user interface control. The messages are filtered to determine if they should be passed to the new window manager. If a message is to be passed, the message is forwarded to the root Visual Gadget in the new window manager. The message is processed and routed down the window tree to an adapter control for hosting the legacy user interface control. The adapter control processes the message and routes the message to any listener objects attached to the adapter. The new window manager may also clip the hosted visual gadget. If the message has not been completely handled, the message is "bubbled" up the window tree to the parent objects of the adapter control for additional processing.

The present invention also provides a method, computer-controlled apparatus, and a computer-readable medium for adapting and hosting legacy user interface controls.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a method and apparatus for adapting and hosting legacy user interface controls. Aspects of the invention may be embodied in a computer operating system capable of providing a graphical user interface. Referring now to the figures, in which like numerals represent like elements, an actual embodiment of the present invention will be described.

Figure 1:
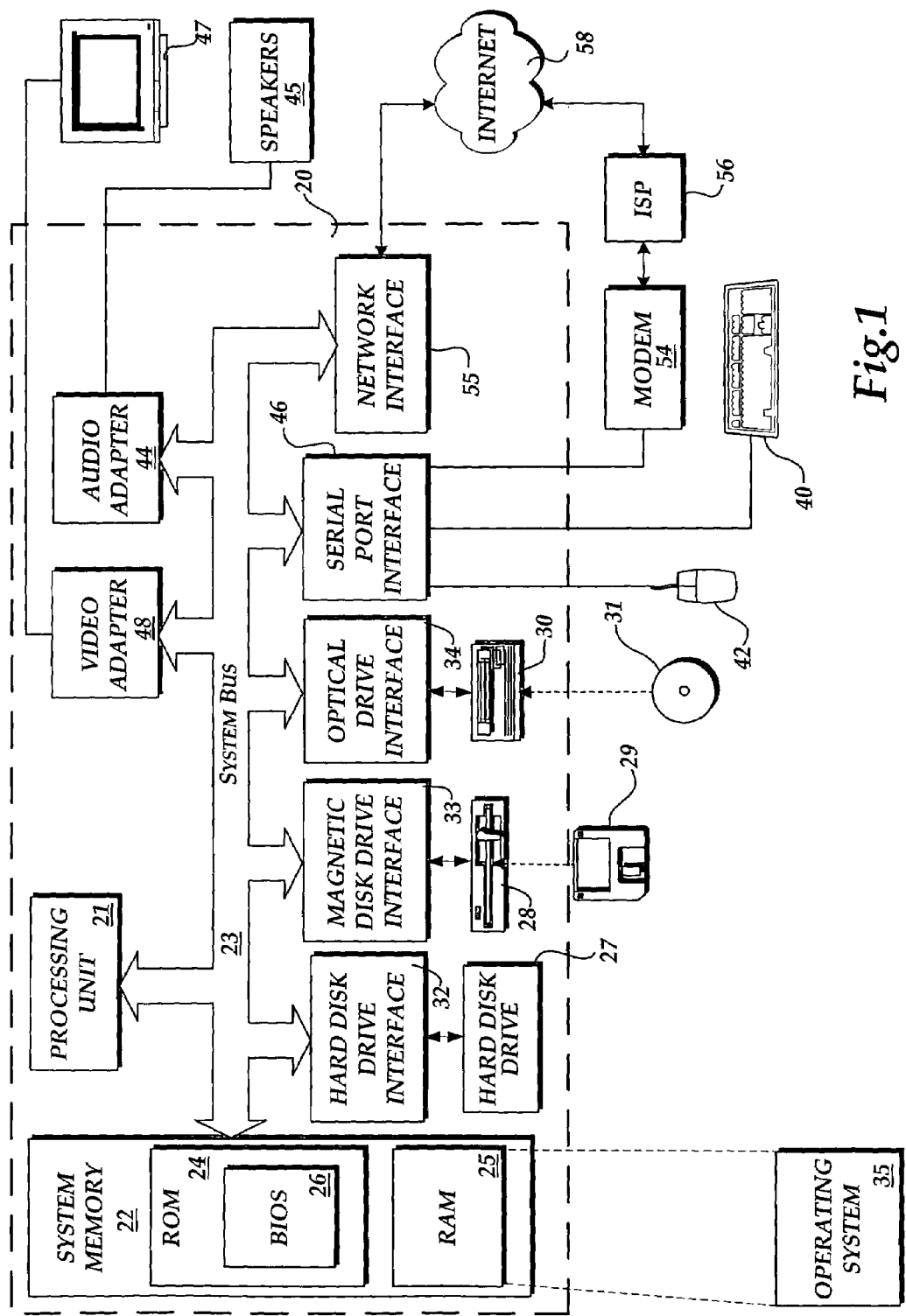
FIG. 1 is a block diagram showing an illustrative operating environment for an actual embodiment of the present invention.

Referring now to FIG. 1, an illustrative personal computer 20 for implementing aspects of the present invention will be described. The personal computer 20 comprises a conventional personal computer, including a processing unit 21, a system memory 22, and a system bus 23 that couples the system memory to the processing unit 21. The system memory 22 includes a read only memory ("ROM") 24 and a random access memory ("RAM") 25. A basic input/output system 26 ("BIOS") containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD").

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that computer-readable media can be any available media that can be accessed by the personal computer 20. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the personal computer 20.

A number of program modules may be stored in the drives and RAM 25, including an operating system 35, such as Windows 98®, Windows 2000®, or Windows NT® from Microsoft® Corporation. As will be described in greater detail below, aspects of the present invention are implemented within the operating system 35 in the actual embodiment of the present invention described herein.

A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus ("USB"). A monitor 47 or other type of display device is also connected to the system bus 23 via an display interface, such as a video adapter 48. In addition to the monitor, a personal computer 20 may include other peripheral output devices, such as speakers 45 connected through an audio adapter 44 or a printer (not shown).

As described briefly above, the personal computer 20 may operate in a networked environment using logical connections to one or more remote computers through the Internet 58. The personal computer 20 may connect to the Internet 58 through a network interface 55. Alternatively, the personal computer 20 may include a modem 54 and use an Internet Service Provider ("ISP") 56 to establish communications with the Internet 58. The modem 54, which may be internal or external, is connected to the system bus 23 via the serial port interface 46. It will be appreciated that the network connections shown are illustrative and other means of establishing a communications link between the personal computer 20 and the Internet 58 may be used.

Figure 2:
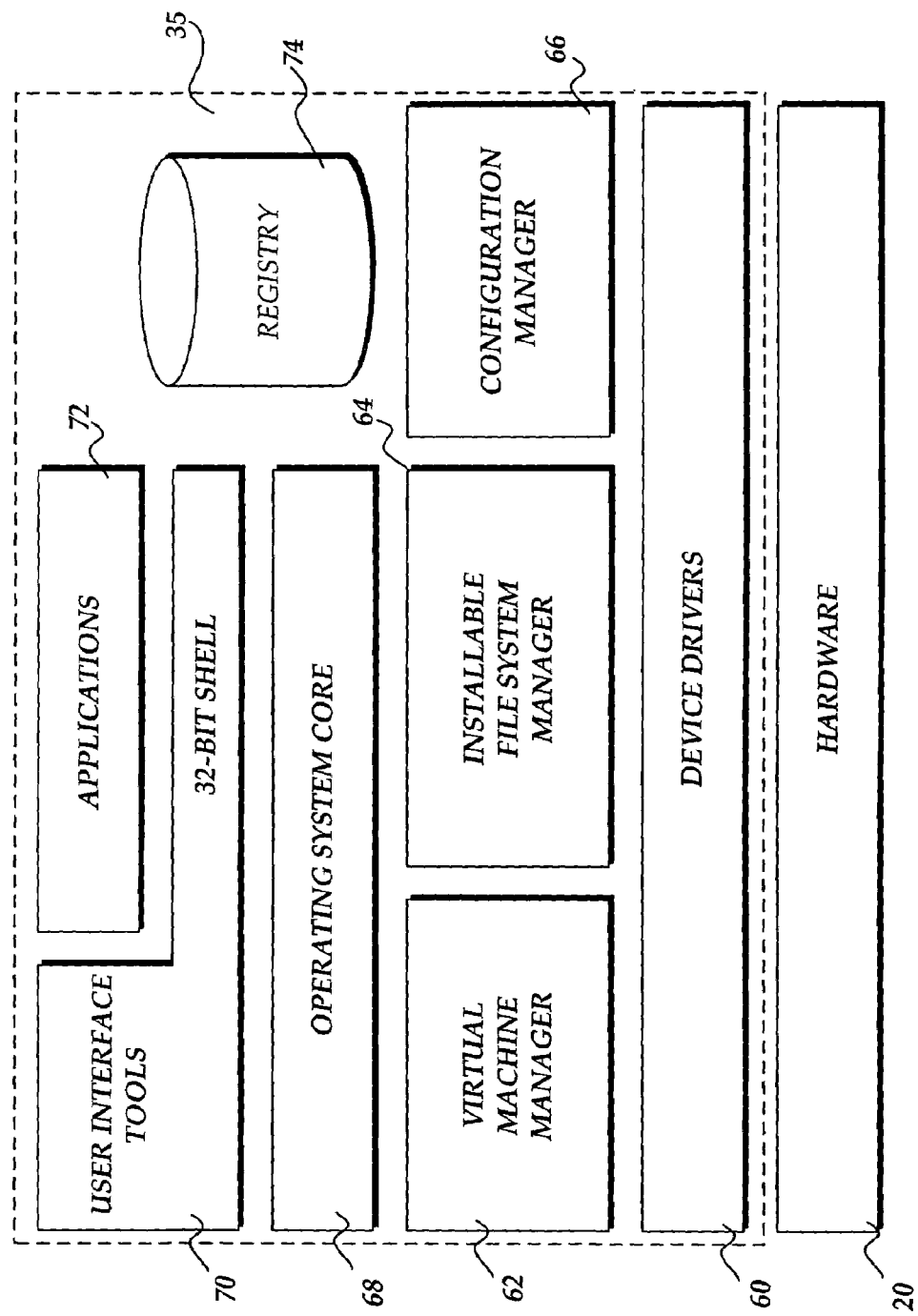
FIG. 2 is a block diagram showing aspects of an operating system utilized in conjunction with an actual embodiment of the present invention.

Referring now to FIG. 2, additional aspects of the operating system 35 will be described. The operating system 35 comprises a number of controls for executing applications 72 and communicating with the hardware that comprises the personal computer 20. At the lowest level, the operating system 35 comprises device drivers 60 for communicating with the hardware 20. The operating system 35 also comprises a virtual machine manager 62, an installable file system manager 64, and a configuration manager 66. Each of these managers may store information regarding the state of the operating system 35 and the hardware 20 in a registry 74. The operating system 35 also provides a shell 70, which includes user interface tools. An operating system core 68 is also provided which provides low-level functionality and hardware interfaces. According to the actual embodiment of the present invention described herein, aspects of the present invention are implemented in the operating system core 68. The operating system core 68 is described in greater detail below with respect to FIG. 3.

Figure 3:
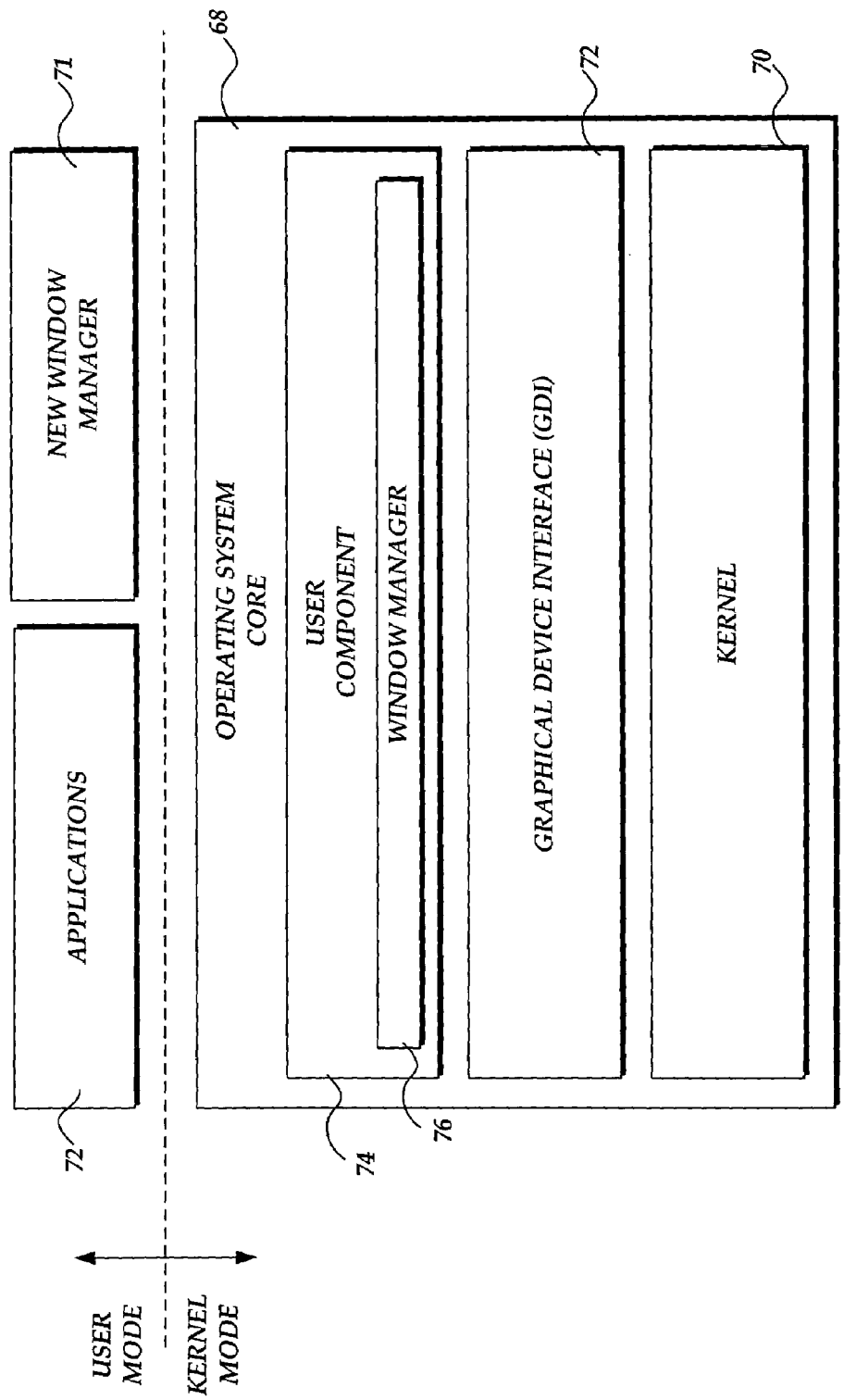
FIG. 3 is a block diagram illustrating additional aspects of an operating system utilized in conjunction with an actual embodiment of the present invention.

Turning now to FIG. 3, an illustrative operating system core 68 will be described. As mentioned above, the Windows® operating system provides an illustrative operating environment for the actual embodiment of the present invention described herein. The operating system core 68 of the Windows® operating system comprises three main controls: the kernel 70; the graphical device interface ("GDI") 72; and the User component 74. The GDI 72 is a graphical system that draws graphic primitives, manipulates bitmaps, and interacts with device-independent graphics drivers, including those for display and printer output devices. The kernel 70 provides base operating system funictionality, including file I/O services, virtual memory management, and task scheduling. When a user wants to start an application, the kernel 70 loads the executable ("EXE") and dynamically linked library ("DLL") files for the application. The kernel 70 also provides exception handling, allocates virtual memory, resolves import references, and supports demand paging for the application. As an application runs, the kernel 70 schedules and runs threads of each process owned by an application.

The User component 74 manages input from a keyboard, mouse, and other input devices and output to the user interface (windows, icons, menus, and so on). The User component 74 also manages interaction with the sound driver, timer, and communications ports. The User component 74 uses an asynchronous input model for all input to the system and applications. As the various input devices generate interrupts, an interrupt handler converts the interrupts to messages and sends the messages to a raw input thread area, which, in turn, passes each message to the appropriate message queue. Each Win32-based thread can have its own message queue.

In order to manage the output to the user interface, the User component 74 maintains a window manager 76. The window manager 76 comprises an executable software component for keeping track of visible windows and other user interface controls, and rendering these controls into video memory. Because the window manager 76 comprises an existing portion of the Microsoft Windows® operating system, the window manager may also be referred to herein as a legacy window manager. Also, although the invention is described as implemented within the Windows® operating system, those skilled in the art should appreciate that the present invention may be advantageously implemented within any operating system that utilizes a windowing graphical user interface.

As shown in FIG. 3, applications 22 are executed in User mode while the operating system core 68 is executed in kernel mode. Additionally, a new window manager 71 may be provided that executes in User mode and provides additional window manager functionality. Aspects of the actual embodiment of the present invention described herein are implemented as a part of the new window manager 71.

Several types of user interface controls may be available to the new window manager 71. Native user interface objects, or Visual Gadgets, that are specifically designed to operate with the new window manager 71 may be available. Additionally, legacy user interface objects designed to work with the legacy window manager 76 may also be available within the computing environment. For instance, according to the actual embodiment of the present invention described herein, the new window manager 71 is operative to utilize user interface controls called Visual Gadgets, or HGADGETS. Through the process that will be described in greater detail below, however, the new window manager 71 can also utilize legacy user interface controls such as HWNDS, which are handles to a window in the Win32 environment, utilized by the legacy window manager 76. Other types of legacy user interface controls may also be hosted in a similar manner.

Figure 4:
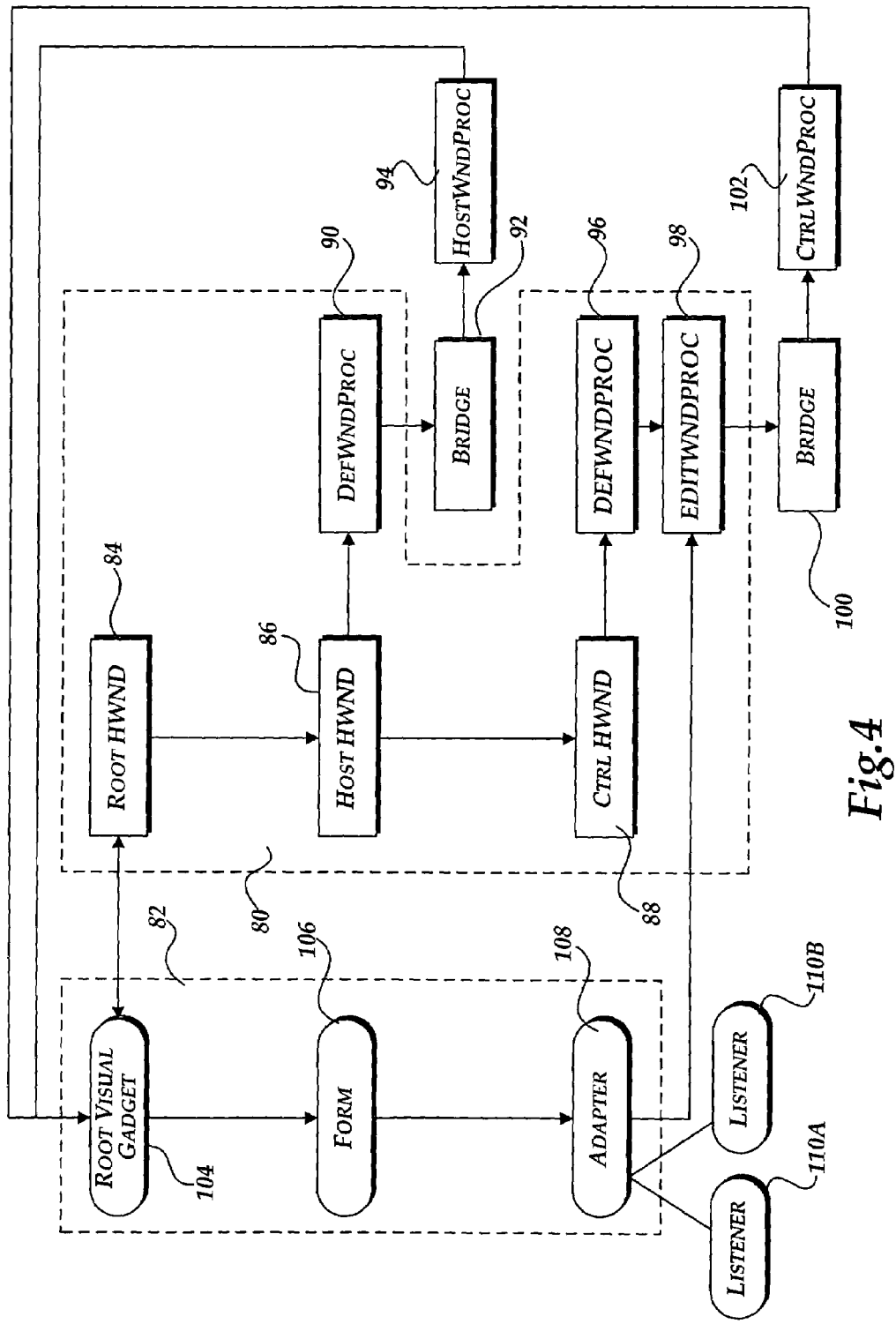
FIG. 4 is a block diagram showing an illustrative software architecture utilized in an actual embodiment of the present invention.

Referring now to FIG. 4, an illustrative software architecture for implementing aspects of the present invention will be described. A legacy window tree 80 is shown in FIG. 4 that is maintained by a legacy window manager. For example, an illustrative legacy window tree 80 may include a Root HWND 84, a Host HWND 86, and a Control HWND 88. As known to those skilled in the art, the Host HWND 86 and the Control HWND 88 have associated procedures for handling unprocessed messages, DefWndProc 90 and 96, respectively. The Host HWND 86 also provides trapping of "parent-only" messages, including the WM_COMMAND message, and forwards them into the root Visual Gadget 104 for processing. The Host HWND 86 also provides clipping regions that can be set on the parent. In this manner, the painting of the existing child control may be clipped in a way that works with APIs, such as ScrollWindow( ), that may have problems if the clipping region was set on the child instead. It should be appreciated by those skilled in the art that a visible region may be set on the Host HWND 86 so that the Host HWND 86 is made aware of any Visual Gadget that would overlap the Host HWND 86. This way, the Host HWND 86 can compensate for the Visual Gadgets that would obscure it. Procedures for calculating a visible region are known to those skilled in the art.

According to an actual embodiment of the present invention, software bridges 92 and 100 are provided for intercepting messages intended for the hosted legacy user interface control. In the illustrative example, the bridge 92 receives messages from the DefWndProc 90 and the bridge 100 receives messages from the EditWndProc 98. The bridge 92 forwards received messages to the HostWndProc 94 and the bridge 100 forwards messages to the CtrlWndProc 102. As will be described in greater detail below with respect to FIG. 5, the HostWndProc 94 and the CtrlWndProc 102 may forward the message to the root Visual Gadget in the new window tree 82 for processing.

FIG. 4 also shows a new window tree 82. The new window tree 82 is maintained by a new window manager. As described briefly above, the new window manager utilizes Visual Gadgets natively, but may host legacy user interface controls through the process described herein. As an illustrative example, the new window tree 82 may comprise a root Visual Gadget 104, a form Visual Gadget 106, and an adapter object 108 that is associated with the hosted legacy user interface control. The adapter object 108 may also have attached listeners 110A-B that may be interested in receiving messages intended for the hosted legacy user interface control.

Figure 5A:
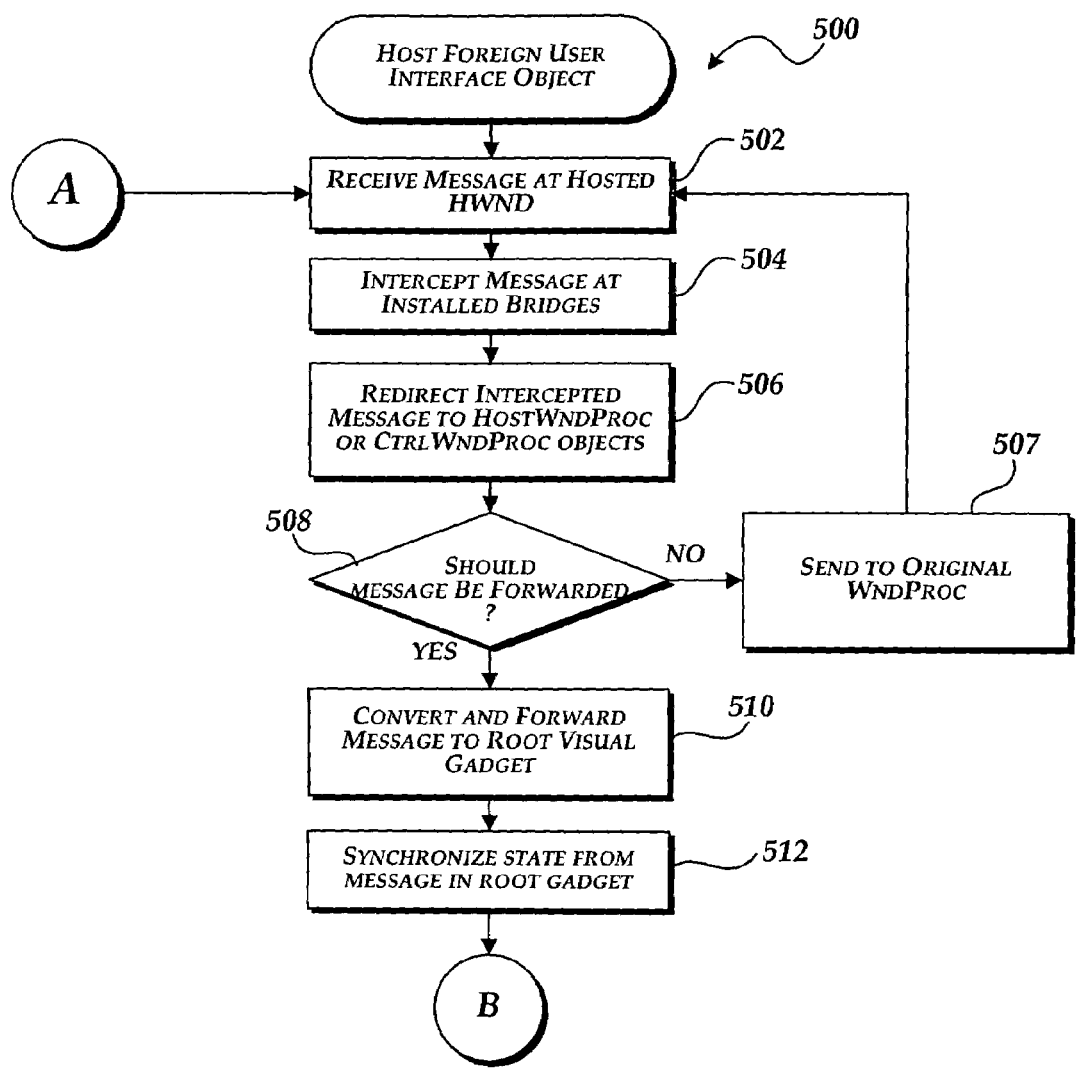
FIGS. 5A and 5B are a flow diagram showing an illustrative routine for adapting and hosting legacy user interface components according to an actual embodiment of the present invention.
Figure 5B:
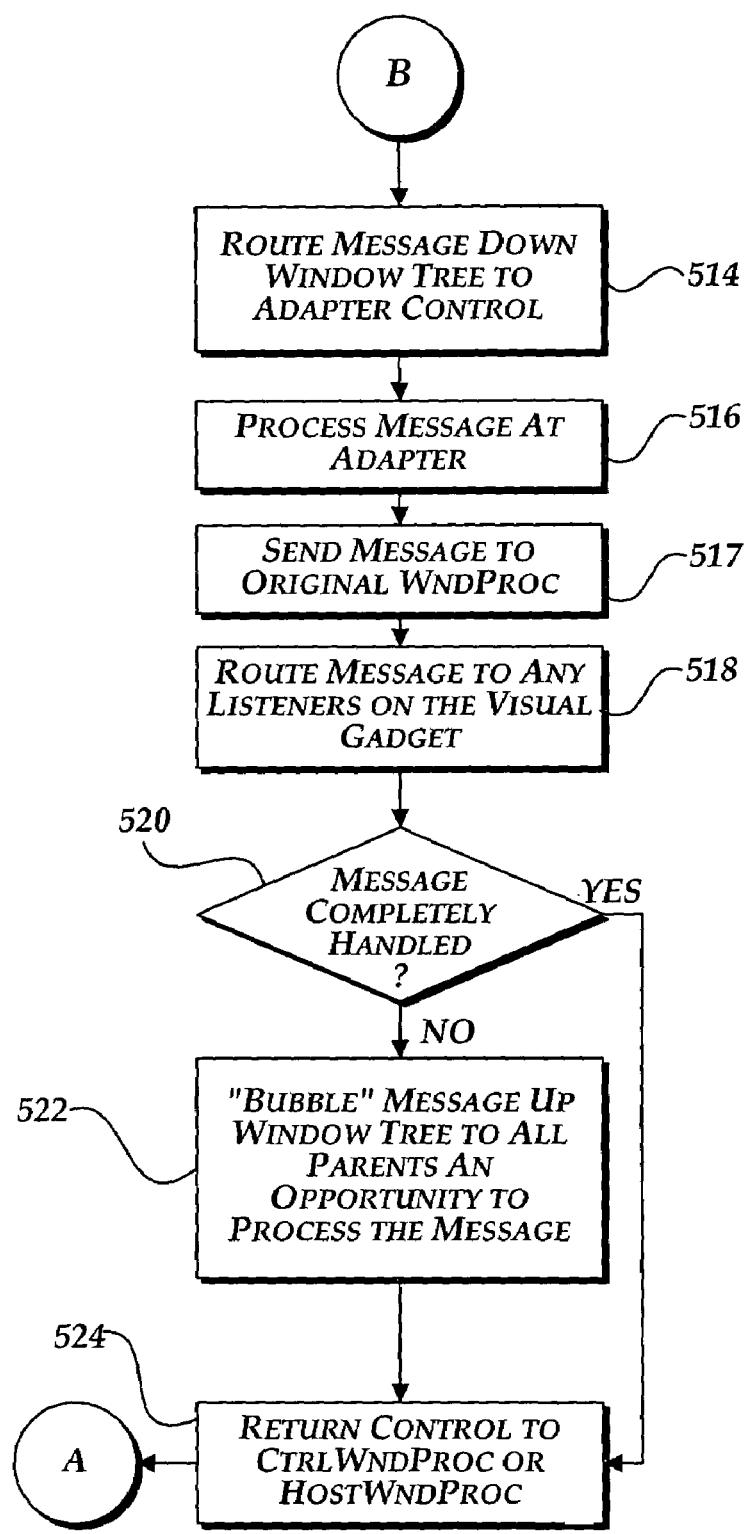

Referring now to FIGS. 5A and 5B, an illustrative Routine 500 for adapting and hosting legacy user interface controls will be described. The Routine 500 begins at block 502, where a message is received at the Host HWND 86, such as a WM_COMMAND message, or the Control HWND 88, such as WM_LBUTTONDOWN. From block 502, the Routine 500 continues to block 504, where the message is intercepted by the appropriate bridge 92 or 100. The Routine 500 then continues to block 506, where the intercepted message is redirected to either the HostWndProc 94 or the CtrlWndProc 102 object, respectively. The Routine 500 then continues to block 508.

At block 508, a determination is made at either the HostWndProc 94 or the CtrlWndProc 102 object as to whether the message should be forwarded to the new window manager. According to one actual embodiment of the invention, the HostWndProc 94 and the CtrlWndProc 102 may be customized to handle similar messages differently depending upon external variables. For instance, some controls utilize an alternate WndProc to process messages. It may be advantageous not to forward some messages, such as mouse movement messages, to this type of control. On the other hand, mouse movement messages should be forwarded to many other types of controls.

If, at block 508, it is determined that the message should not be forwarded, the Routine 500 branches to block 507, where the message is sent to the original WndProc. The Routine 500 then continues to block 502, where additional messages are processed. If, at block 508, it is determined that the message should be forwarded, the Routine 500 continues to block 510. At block 510, the intercepted message is converted to a format usable by the new window manager and is forwarded to the root Visual Gadget 104. When the message is received at the root Visual Gadget 104, the message no longer contains information indicating that it originated from a legacy user interface control.

From block 510, the Routine 500 continues to block 512, where the message state is synchronized in the root Visual Gadget 104, updating any cached state such as keyboard focus. From block 512, the Routine 500 continues to block 514, where the message is routed down the window tree to the adapter control 108. During this routing process, all parent objects of the adapter control 108 are given an opportunity to process the message. At block 516, the message is processed at the adapter control 108, if it reaches the adapter control 108. As a part of its processing of the message, the adapter control 108 may convert the message back into a message format understood by the legacy window manager, such as Win32, and transmit the message back to the EditWndProc object 98. In this manner, the original EditWndProc object 98 is provided an opportunity to process the message at block 517. The EditWndProc object 98 is unaware that the message originated in the new window manager.

From block 517, the Routine 500 continues to block 518, where the message is routed from the adapter control 108 to any attached listener objects, such as listeners 110A-B. In this manner, the listeners 110A-B are provided an opportunity to process the message. This allows other Visual Gadgets to take part in processing the message without requiring C++ or WNDPROC sub-classing. From block 518, the Routine 500 continues to block 520 where a determination is made as to whether the message has been completely processed. If the message has been completely processed, the Routine 500 branches to block 524, described below. If the message has not been completely processed, the Routine 500 continues to block 522, where the message is "bubbled up" the window tree, thereby providing all of the parent objects with an opportunity to process the message after the EditWndProc object 98 has completed its processing. The Routine 500 then continues to block 524.

At block 524, control is returned to the CtrlWndProc object 102 or the HostWndProc object 94. If the message was not originally sent to the new window manager, or the message was not fully processed, the message is sent to the original EditWndProc 98 for the control, or the DefWndProc 90 for the host. The Routine 500 then returns to block 502 where additional messages are processed.

In light of the above, it should be appreciated by those skilled in the art that the present invention provides a method, apparatus, and computer-readable medium for adapting and hosting legacy user interface controls. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A computer implemented method for hosting a legacy user interface object originally intended for use in a windows-based legacy window manager in a windows-based new window manager, comprising:
providing a software bridge between said legacy window manager and said legacy user interface object that allows said legacy user interface object to be used by both said new window manager and said legacy window manager;
intercepting a message at said software bridge intended for said legacy user interface object;
determining whether said message should be forwarded to said new window manager; and
in response to determining that said message should be forwarded to said new window manager:
forwarding said message to a root user interface object hosted in a window tree maintained by said new window manager;
routing said message from said root user interface object down said window tree to an adapter control associated with said legacy user interface object;
processing said message at said adapter control;
converting said message to a message format understood by said legacy window manager;
removing information from said message indicating that it originated from the new window manager; and
forwarding said message to a procedure originally intended to handle said message.

2. The method of claim 1, further comprising:
routing said message from said adapter control to a listener object attached to said adapter control.

3. The method of claim 1, wherein the new window manager is configured to operate in user mode, and wherein the legacy window manager is configured to operate in kernel mode.

4. The method of claim 1, wherein both the legacy window manager and the new window manager are capable of managing output to the entire user interface.

5. A computer-readable storage medium having computer executable instructions stored thereon that, when executed on a computing device, cause the computing device to carry out a computer implemented method for hosting a legacy user interface object intended for use in a legacy window manager in a windows-based new window manager, the method comprising:
(a) providing a software bridge between said legacy window manager and said legacy user interface object that allows said legacy user interface object to be used by both said new window manager and said legacy window manager;
(b) intercepting a message at said software bridge intended for said legacy user interface object;
(c) determining whether said message should be forwarded to said new window manager; and
(d) in response to determining that said message should be forwarded to said new window manager:
(1) forwarding said message to a root user interface object hosted in a window tree maintained by said new window manger;
(2) routing said message from said root user interface object down said window tree to an adapter control associated with said legacy user interface object;
(3) processing said message at said adapter control;
(4) converting said message to a message format understood by said legacy window manager;
(5) removing information from said message indicating that it originated from the new window manager; and
(6) forwarding said message to a procedure originally intended to handle said message.

* * * * *